United States Patent
Liao et al.

(10) Patent No.: US 8,068,179 B2
(45) Date of Patent: Nov. 29, 2011

(54) ON-SCREEN DISPLAY DEVICE WITH COMPRESSED DATA AND DISPLAY METHOD THEREOF

(75) Inventors: Shih-Ting Liao, Changhua (TW); Yuan-Chih Peng, Taipei (TW)

(73) Assignee: Sunplus Technology Co., Ltd. (TW)

( * ) Notice: Subject to any disclaimer, the term of this patent is extended or adjusted under 35 U.S.C. 154(b) by 1259 days.

(21) Appl. No.: 11/737,129

(22) Filed: Apr. 18, 2007

(65) Prior Publication Data

US 2008/0049143 A1 Feb. 28, 2008

(30) Foreign Application Priority Data

Aug. 28, 2006 (TW) .............................. 95131605 A

(51) Int. Cl.
*H04N 7/00* (2011.01)

(52) U.S. Cl. ...................................... 348/569

(58) Field of Classification Search .................. 348/569, 348/563–568, 552, 553, 725, 555, 556, 558, 348/461, 465, 468, 469, 473; 345/603, 604, 345/605, 660, 670, 671, 667

See application file for complete search history.

(56) References Cited

U.S. PATENT DOCUMENTS

| | | | | |
|---|---|---|---|---|
| 5,825,424 A | * | 10/1998 | Canfield et al. | 375/240.15 |
| 5,969,770 A | | 10/1999 | Horton | |
| 6,011,539 A | * | 1/2000 | Hamilton et al. | 345/156 |
| 6,208,354 B1 | * | 3/2001 | Porter | 345/634 |
| 6,275,267 B1 | * | 8/2001 | Kobayashi | 348/555 |
| 6,462,746 B1 | * | 10/2002 | Min et al. | 345/545 |
| 6,529,244 B1 | | 3/2003 | Hrusecky | 348/453 |
| 7,079,193 B2 | * | 7/2006 | Choi | 348/564 |
| 7,109,974 B2 | * | 9/2006 | Kempisty | 345/173 |
| 7,212,250 B1 | * | 5/2007 | Neal | 348/569 |
| 7,839,452 B2 | * | 11/2010 | Choi | 348/441 |

* cited by examiner

*Primary Examiner* — Paulos Natnael

(74) *Attorney, Agent, or Firm* — Lowe Hauptman Ham & Berner, LLP

(57) ABSTRACT

An on-screen display (OSD) device includes a memory, a processing unit, a buffer, a buffer controller, a decompression engine and an OSD video processing engine. The memory stores an OSD data to be played or processed. The processing unit reads the OSD data from the memory and produces a compressed OSD image data and OSD information. The buffer temporarily stores the compressed OSD image data for display. The decompression engine decompresses the compressed OSD image data temporarily stored in the buffer into an OSD image data and stores the OSD image data in the buffer. The OSD video processing engine receives the OSD information outputted from the processing unit through the buffer controller and produces an OSD image display data.

18 Claims, 4 Drawing Sheets

ON-SCREEN DISPLAY DEVICE WITH COMPRESSED DATA AND DISPLAY METHOD THEREOF

RELATED APPLICATIONS

The present application is based on, and claims priority from, Taiwan R.O.C. Application Number 095131605, filed Aug. 28, 2006, the disclosure of which is hereby incorporated by reference herein in its entirety.

BACKGROUND OF THE INVENTION

1. Field of the Invention

The invention relates to the technical field of on-screen displays (OSDs) and, more particularly, to an on-screen display device with compressed data and the display method thereof.

2. Description of Related Art

Televisions have become a popular household appliance for every family, and have developed with the advance electronic technologies to thus provide enhanced image qualities and more program channels. In addition, an on-screen display (OSD) device is applied to a TV screen in order to show certain specific fonts or graphics carrying with messages on the screen to a viewer. When the viewer operates the TV to change the channel, volume, quality, or the like, current states are accordingly displayed on the TV screen and shown to the viewer. Therefore, the OSD device has become an important message generator implemented in a human-machine interface.

A typical OSD configuration can be divided into bitmap base and font base. A bitmap-based OSD device can provide a user interface with more graphic images, which requires a larger memory capacity. A font-based OSD device provides a convenient software development and requires a smaller memory capacity, but it can only provide simple OSD frames.

FIG. 1 is a block diagram of a typical bitmap-based OSD device. As shown in FIG. 1, the ROM 110 stores the OSD data to be displayed. The processor 120 processes and combines the OSD data to be displayed into a bitmap data, and stores the bitmap data in the buffer 140 through the buffer controller. The processor 120 also processes the display information for the bitmap data. The OSD display engine 150 performs a color plate correspondence to the bitmap data stored in the buffer 140 in accordance with the display information, and accordingly produces an OSD image display data. The mixer 160 mixes the OSD image display data and a video image for displaying on a display.

When a 512×200 bitmap image containing 16 colors is displayed, the ROM 110 requires a memory capacity of 50 Kbytes ((512×200 pixels×4 bits/pixel)/8 bits) to store the bitmap image. For the users, the quality of current TV operating interfaces is desired higher and higher, so that the bitmap-based OSD device requires a larger external memory for storing the increasingly complex OSD images, which increases the cost.

To overcome this problem, the U.S. Pat. No. 5,969,770 granted to Horton entitled "Animated on-screen display provisions for an MPEG video signal processing system" uses an MPEG approach to compress an animated OSD image stream and store the compressed image stream in the ROM. When the compressed image stream is to be displayed, a multiplexer sends the compressed image stream to an MPEG decoder in a predetermined period for decompression and output through a video channel. Such a way can save the memory space but cannot apply to a TV or a display without the MPEG decompressor.

SUMMARY OF THE INVENTION

An object of the invention is to provide an on-screen display device with compressed data and the display method thereof, which can reduce the size requirement for an external memory to thereby save the cost.

Another object of the invention is to provide an on-screen display device with compressed data and the display method thereof, which can store an increasingly complex OSD image and meet the requirement for high quality operating interface.

In accordance with one aspect of the invention, there is provided an on-screen display (OSD) device. The OSD device includes a memory, a processing unit, a buffer, a buffer controller, a decompression engine and an OSD video processing engine. The memory stores an OSD data to be played or processed. The processing unit is connected to the memory in order to read the OSD data from the memory and produce a compressed OSD image data and OSD information. The buffer temporarily stores the compressed OSD image data for display. The buffer controller is connected between the buffer and the processing unit in order to control an access of the buffer. The decompression engine is connected to the buffer controller in order to decompress the compressed OSD image data temporarily stored in the buffer into an OSD image data and store the OSD image data in the buffer through the buffer controller. The OSD video processing engine is connected to the buffer controller in order to receive the OSD information output from the processing unit through the buffer controller and produce an OSD image display data based on the OSD information and the OSD image data stored in the buffer.

In accordance with another aspect of the invention, there is provided an on-screen display (OSD) method. The OSD method includes: (A) reading an OSD data to be played or processed from a memory; (B) processing the OSD data read from the memory to thereby produce a compressed OSD image data and OSD information; (C) temporarily storing the compressed OSD image data to be played; (D) decompressing the compressed OSD image data to thereby produce an OSD image data; (E) producing an OSD image display data based on the OSD information and the OSD image data; (F) mixing the OSD image display data with an image datastream for displaying on a display.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
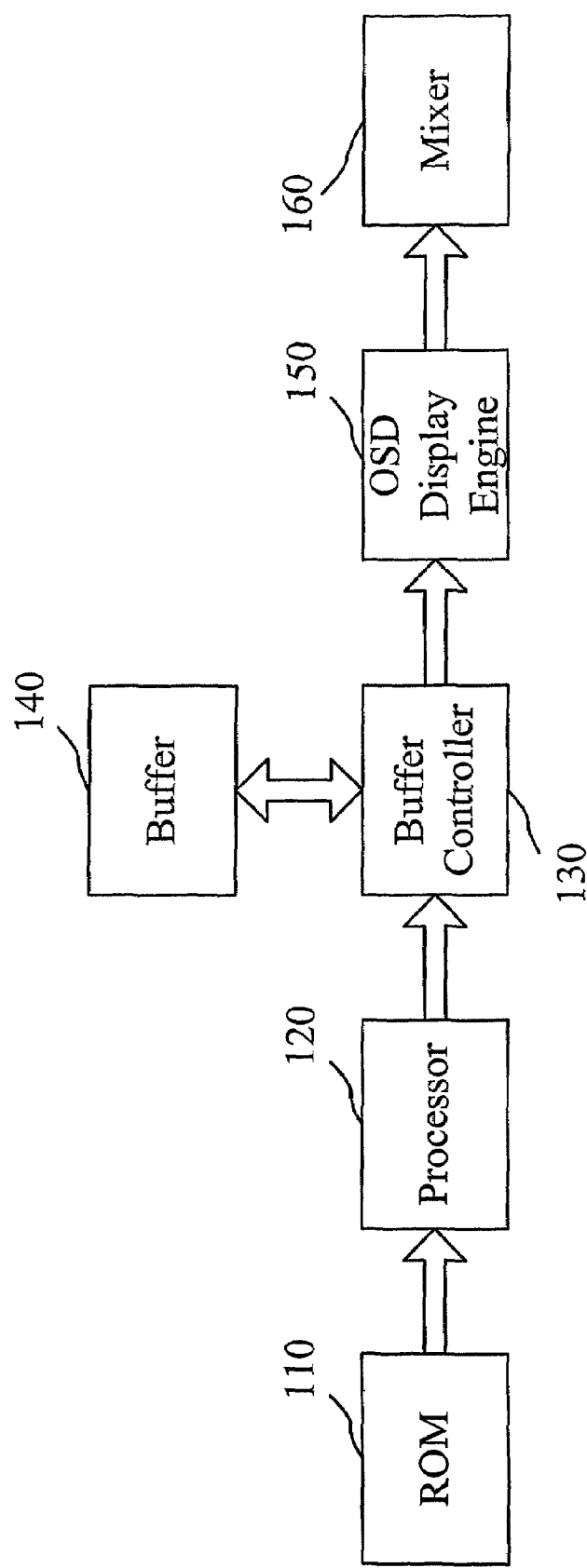
FIG. 1 is a block diagram of a typical bitmap-based OSD device.
Figure 2:
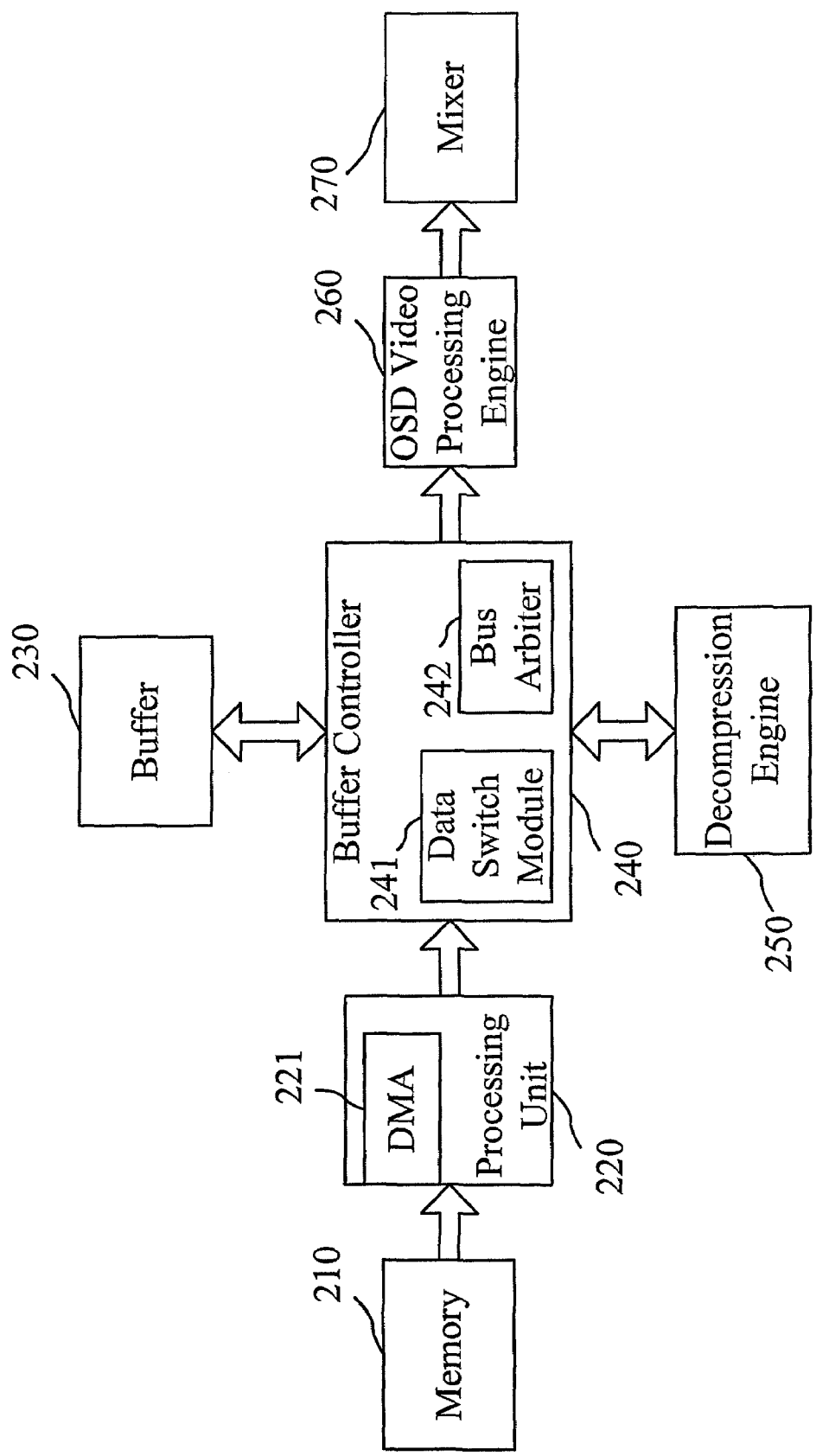
FIG. 2 is a block diagram of an OSD device in accordance with the invention.

FIG. 2 is a block diagram of an OSD device with compressed data in accordance with the invention. The OSD device includes a memory 210, a processing unit 220, a buffer 230, a buffer controller 240, a decompression engine 250, an OSD video processing engine 260 and a mixer 270.

The memory 210 stores an OSD data to be played or processed. The memory 210 is a nonvolatile memory, wherein the nonvolatile memory is preferably a flash memory.

The processing unit 220 is connected to the memory 210 in order to read the OSD data from the memory 210 and produce a compressed OSD image data and OSD information. The processing unit 220 includes a direct memory access (DMA) unit 221, connected to the memory 210, in order to directly access the OSD data stored in the memory 210.

The buffer 230 temporarily stores the compressed OSD image data to be played. In this embodiment, the buffer 230 is a dynamic random access memory (DRAM). In other embodiments, the buffer 230 can be a synchronous DRAM (SDRAM) or a double data rate DRAM. When the buffer 230 is a double data rate DRAM, the double data rate DRAM can be one selected from a group consisting of DDR-I, DDR-II, DDR-333 and DDR-400.

The buffer controller 240 is connected between the buffer 230 and the processing unit 220 in order to control an access of the buffer 230. The buffer controller 240 includes a data switch module 241 and a bus arbiter 242. The data switch module 241 transfers the data among the buffer 230, the processing unit 220, the decompression engine 250 and the OSD video processing engine 260.

The bus arbiter 242 determines the priority of the processing unit 220, the decompression engine 250 and the OSD video processing engine 260 for accessing the buffer 230. The bus arbiter 242 uses a fixed priority to determine the priority of the processing unit 220, the decompression engine 250 and the OSD video processing engine 260 for accessing the buffer. In other embodiments, the bus arbiter 242 can use a round-robin scheme to determine the priority of the processing unit 220, the decompression engine 250 and the OSD video processing engine 260 for accessing the buffer.

The decompression engine 250 is connected to the buffer controller 240 in order to read the compressed OSD image data temporarily stored in the buffer into an OSD image data through the buffer controller 240 and decompress the compressed OSD image data into the OSD image data. The OSD image data is stored in the buffer 230 through the buffer controller.

The decompression engine 250 can perform a lossless decompression on the compressed OSD image data. The decompression engine 250 can perform a non-lossless decompression on the compressed OSD image data. Generally, the non-lossless decompression is performed on the content of direct color mapping, and the lossless decompression is performed on the content of color index mapping. The non-lossless decompression is preferably JPEG decompression.

The OSD video processing engine 260 is connected to the buffer controller 240 in order to receive the OSD information outputted from the processing unit 220 through the buffer controller and produce an OSD image display data in accordance with the OSD information and the OSD image data stored in the buffer 230. The OSD image display data is a bitmap image data.

The mixer 270 is connected to the OSD video processing engine 260 in order to mix the OSD image display data with an image datastream for displaying on a display.

Figure 3:
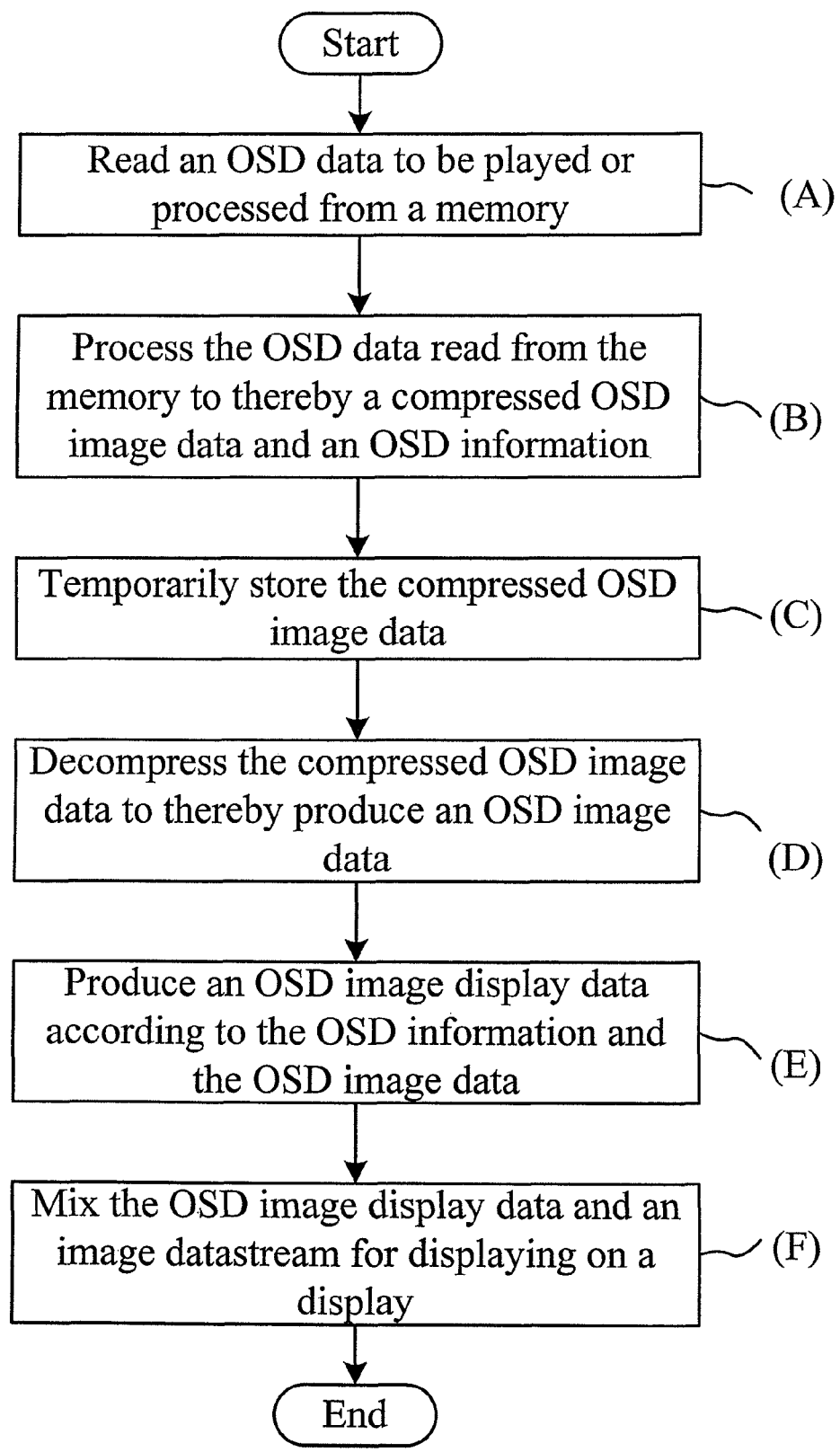
FIG. 3 is a flowchart of an OSD method in accordance with the invention.
Figure 4:
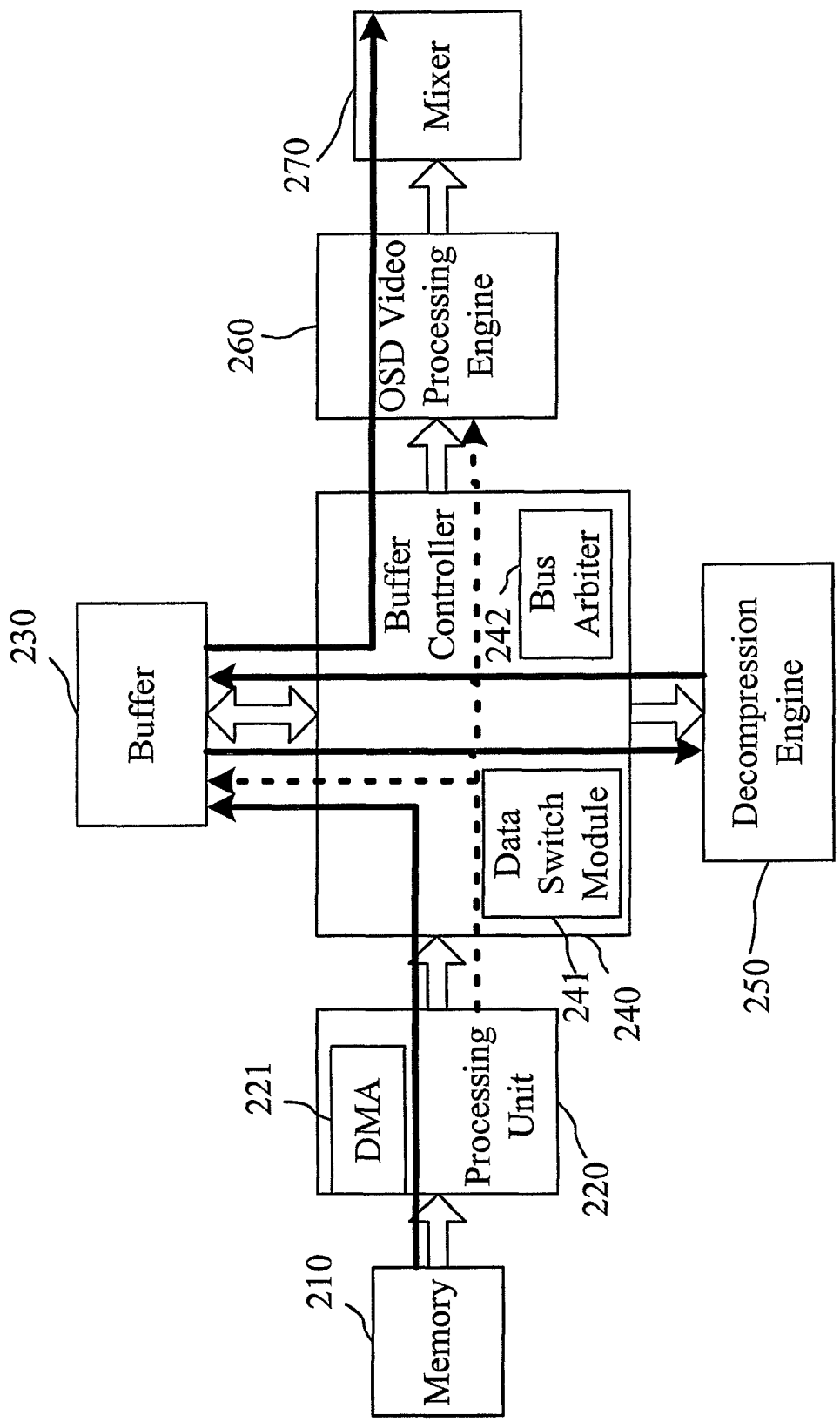
FIG. 4 is a schematic diagram of a data transfer of an OSD device in accordance with the invention.

FIG. 3 is a flowchart of an OSD method in accordance with the invention. FIG. 4 is a schematic diagram of a data transfer of an OSD device in accordance with the invention. As shown in FIG. 3, in step (A), the processing unit 220 reads the OSD data to be played or processed from the memory 210. In this embodiment, the memory 210 is a read-only memory (ROM) to store compressed OSD data and non-compressed OSD data. For displaying the compressed OSD data, the compressed OSD data is stored in the buffer 230 through the processing unit 220 or the DMA unit 221. In addition, for displaying the non-compressed OSD data, the non-compressed OSD data is processed by the processing unit 220 to thereby produce a desired OSD bitmap. In step (B), the processing unit 220 processes the OSD data read from the memory to thereby produce a compressed OSD image data and OSD information.

In step (C), the processing unit 220 temporarily stores the compressed OSD image data in the buffer 230 for display. The processing unit 220 temporarily stores the compressed OSD image data in the buffer 230 or sends it to the OSD video processing engine 260. As shown in FIG. 4, the flow of the compressed OSD image data is indicated with the solid lines, and the flow of the OSD information is indicated with the dotted line.

In step (D), the decompression engine 250 reads the compressed OSD image data temporarily stored in the buffer 230 through the buffer controller 240, and decompresses the compressed OSD image data to thereby produce an OSD image data. The decompression engine 250 stores the OSD image data in the buffer 230 through the buffer controller 240, which is skipped if the OSD image data is a non-compressed OSD image data.

In step (E), the OSD video processing engine 260 reads the OSD image data temporarily stored in the buffer 230 through the buffer controller 240, and produces an OSD image display data in accordance with the OSD information. In step (F), the mixer 270 mixes the OSD image display data with an image datastream for displaying on a display.

In view of the foregoing, it is known that the invention is able to compress a high quality OSD image and store the pre-compressed OSD image in the memory 210, and then use the decompression engine 250 to decompress the pre-compressed OSD image to thereby obtain the high quality OSD image. Therefore, the size of the memory 210 can be reduced, and thus the cost is saved.

Although the present invention has been explained in relation to its preferred embodiment, it is to be understood that many other possible modifications and variations can be made without departing from the spirit and scope of the invention as hereinafter claimed.

What is claimed is:

1. An on-screen display (OSD) device, comprising:
    a memory, for storing an OSD data;
    a processing unit, connected to the memory, for reading the OSD data from the memory and producing a compressed OSD image data and an OSD information;
    a buffer, for temporarily storing the compressed OSD image data;
    a buffer controller, connected between the buffer and the processing unit, for controlling an access of the buffer;
    a decompression engine, connected to the buffer controller, for decompressing the compressed OSD image data of the buffer into an OSD image data and storing the OSD image data in the buffer through the buffer controller; and
an OSD video processing engine, connected to the buffer controller, for receiving the OSD information outputted from the processing unit through the buffer controller and producing an OSD image display data based on the OSD information and the OSD image data stored in the buffer, wherein, the decompression engine performs a non-lossless decompression on the compressed OSD image data, and the non-lossless decompression is JPEG decompression.

2. The OSD device as claimed in claim 1, further comprising a mixer, connected to the OSD video processing engine, for mixing the OSD image display data and an image datastream for displaying on a display.

3. The OSD device as claimed in claim 2, wherein the memory is a read-only memory (ROM).

4. The OSD device as claimed in claim 2, wherein the buffer is a dynamic random access memory (DRAM).

5. The OSD device as claimed in claim 4, wherein the DRAM is a synchronous DRAM.

6. The OSD device as claimed in claim 4, wherein the DRAM is a double data rate DRAM.

7. The OSD device as claimed in claim 1, wherein the processing unit comprises a direct memory access (DMA) unit to directly access the OSD data stored in the memory.

8. The OSD device as claimed in claim 7, wherein the buffer controller comprises:
   a data switch module, for transferring data among the buffer, the processing unit, the decompression engine and the OSD video processing engine; and
   a bus arbiter, for determining a priority of the processing unit, the decompression engine and the OSD video processing engine for accessing the buffer.

9. The OSD device as claimed in claim 8, wherein the bus arbiter uses a fixed priority to determine the priority of the processing unit, the decompression engine and the OSD video processing engine for accessing the buffer.

10. The OSD device as claimed in claim 8, wherein the bus arbiter uses a round-robin scheme to determine the priority of the processing unit, the decompression engine and the OSD video processing engine for accessing the buffer.

11. The OSD device as claimed in claim 1, wherein the OSD image display data is a bitmap image data.

12. An on-screen display (OSD) method, comprising:
   (A) reading OSD data to be played or processed from a memory;
   (B) processing the OSD data read from the memory to thereby produce a compressed OSD image data and an OSD information;
   (C) temporarily storing the compressed OSD image data;
   (D) decompressing the compressed OSD image data to thereby produce an OSD image data;
   (E) producing an OSD image display data based on the OSD information and the OSD image data; and
   (F) mixing the OSD image display data with an image datastream for displaying on a display,
   wherein, the step (D) performs a non-lossless decompression on the compressed OSD image data, and the non-lossless decompression is JPEG decompression.

13. The OSD method as claimed in claim 12, wherein the OSD image display data in step (E) is a bitmap image data.

14. An on-screen display (OSD) device, comprising:
   a memory, for storing an OSD data;
   a processing unit, connected to the memory, for reading the OSD data from the memory and producing a compressed OSD image data and an OSD information, wherein the processing unit comprises a direct memory access (DMA) unit to directly access the OSD data stored in the memory;
   a buffer, for temporarily storing the compressed OSD image data;
   a decompression engine, connected to the buffer controller, for decompressing the compressed OSD image data of the buffer into an OSD image data and storing the OSD image data in the buffer through the buffer controller;
   an OSD video processing engine, connected to the buffer controller, for receiving the OSD information outputted from the processing unit through the buffer controller and producing an OSD image display data based on the OSD information and the OSD image data stored in the buffer; and
   a buffer controller, connected between the buffer and the processing unit, for controlling an access of the buffer, wherein the buffer controller comprises:
      a data switch module, for transferring data among the buffer, the processing unit, the decompression engine and the OSD video processing engine; and
      a bus arbiter, for determining a priority of the processing unit, the decompression engine and the OSD video processing engine for accessing the buffer.

15. The OSD device as claimed in claim 14, further comprising a mixer, connected to the OSD video processing engine, for mixing the OSD image display data and an image datastream for displaying on a display.

16. The OSD device as claimed in claim 15, wherein the memory is a read-only memory (ROM).

17. The OSD device as claimed in claim 15, wherein the buffer is a dynamic random access memory (DRAM).

18. The OSD device as claimed in claim 17, wherein the DRAM is a synchronous DRAM.

* * * * *